E. C. BROOKS.
Carriage-Spring.
No 40,603. Patented Nov. 17, 1863.
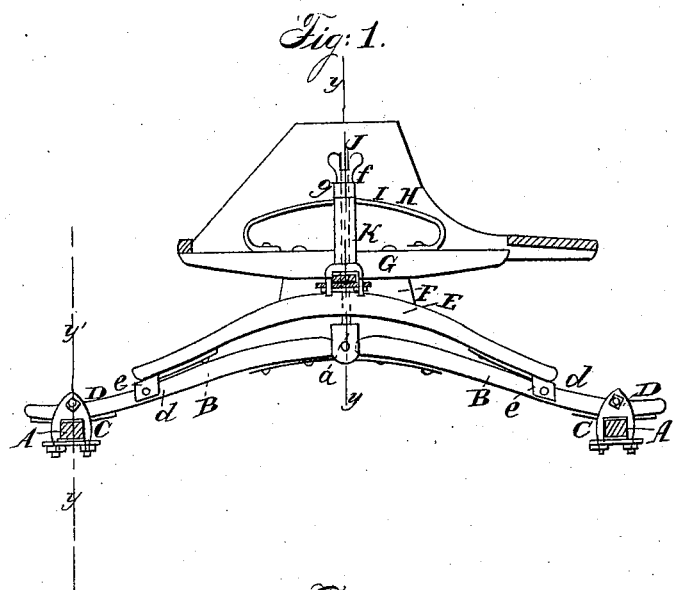
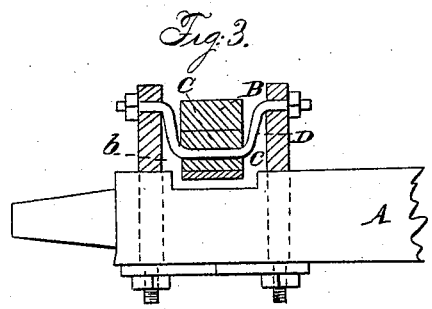
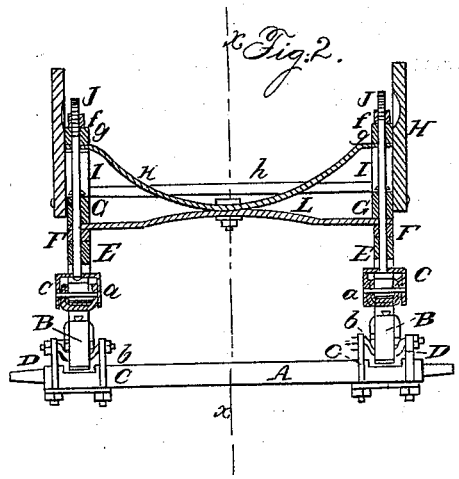
Witnesses
J. W. Coombs
G. W. Reed
Inventor
E. C. Brooks
per Munn & Co
attorneys

UNITED STATES PATENT OFFICE.

ELIPHALET C. BROOKS, OF SAN FRANCISCO, CALIFORNIA.

IMPROVEMENT IN VEHICLE-SPRINGS.

Specification forming part of Letters Patent No. 40,603, dated November 17, 1863.

*To all whom it may concern:*

Be it known that I, ELIPHALET C. BROOKS, of San Francisco, in the county of San Francisco and State of California, have invented a new and Improved Spring for Wheel-Vehicles; and I do hereby declare that the following is a full, clear, and exact description of the same, reference being had to the accompanying drawings, making a part of this specification, in which—

Figure 1 is a side sectional view of my invention applied to a vehicle, *x x*, Fig. 2, indicating the plane of section; Fig. 2, vertical section of the same, taken in the line *y y*, Fig. 1; Fig. 3, an enlarged section of a portion of the same, taken in the line *y y*, Fig. 1.

Similar letters of reference indicate corresponding parts in the several figures.

This invention consists in a novel arrangement and combination of springs, as hereinafter fully shown and described, whereby greater comfort and ease will be obtained in riding, and the vehicle to which the improvement is applied rendered more elastic and ornamental than those provided with the ordinary springs.

To enable those skilled in the art to fully understand and construct my invention, I will proceed to describe it.

A A represent the two axles of a wheel-vehicle, to each of which there are attached two shackles or bars, B B, said shackles or bars being near the ends of the axles. The inner ends of the shackles or bars B B of the two axles are connected together by joints *a*, arranged in any proper way, so that the shackles at each end of the axles may work like toggles. The outer ends of the shackles or bars B B are connected to the axles A A as follows: A clip, C, is secured near each end of each axle A, and in each clip there is fitted a rod or shaft, D, which is bent in crank form, as shown at *b* in Fig. 3, and allowed to swing freely. The ends of the shackles or bars B are fitted in the bent or crank portion *b* of these rods or shafts, said portions having pieces of india-rubber *c* fitted on them, which are inserted in holes in the outer ends of the shackles or bars. By this arrangement it will be seen that the shackles or bars B are allowed to yield or give as the rods or shafts D swing in the clips C.

To each pair of shackles or bars B B a curved bar, E, is attached by pivots *d*, said pivots passing through clips *e*, attached to the ends of the bars E, and through the shackles or bars B, and to the upper surface of each bar B, at its center, there is secured a block, F, said blocks having sill-pieces G attached, on which the body H of the vehicle rests. (See Figs. 1 and 2.)

To the upper surface of each sill-piece G there is attached a semi-elliptic spring, I, and through each spring, at its center, a rod, J, passes vertically. These rods pass down through the sill-pieces G, blocks F, and curved bars E, and are attached at their lower ends to the joints *a* of the shackles or bars B B. The upper ends of the rods J have screw-threads cut on them, on which nuts *f* are fitted, a piece of india-rubber, *g*, being placed on each rod between its spring I and nut *f*. (See Figs. 1 and 3.) The two springs I I are connected by a transverse spring, K, of semi-elliptic form, as shown clearly in Fig. 2, said spring K being connected at its center by a clip, *h*, with a slightly-curved bar, L, the ends of which are attached to the blocks F. This bar L serves as a support for the spring K. The sides of the body H conceal the spring I, as will be seen by referring to Figs. 1 and 3. By this arrangement a very strong, durable, and easy or elastic vehicle-spring is obtained. The shackles or bars B, it will be seen, are connected to the springs I through the medium of the rods J, the play of the shackles or bars being controlled by the yielding of the springs I, in connection with the transverse spring K. The use of a perch or reach is dispensed with, and the body H throughout is not subjected to that twisting or racking motion as when the ordinary elliptic springs are used. The rubber *c* at the outer ends of the shackles or bars B, as well as the rubber *g* on the rods J, prevent wear and unnecessary play. Rubber *c'* may also be placed in the joints *a* of the shackles or bars B.

Having thus described my invention, what I claim as new, and desire to secure by Letters Patent, is—

The shackles or bars B, connected together and applied to the axles A A, as shown, in combination with the curved bars E E L, and the springs I I and K, with or without the rubber *c g c'*, all arranged substantially as and for the purpose herein set forth.

ELIPHALET C. BROOKS.

Witnesses:
RICHARD B. NOYES,
E. V. JOICE.